UNITED STATES PATENT OFFICE.

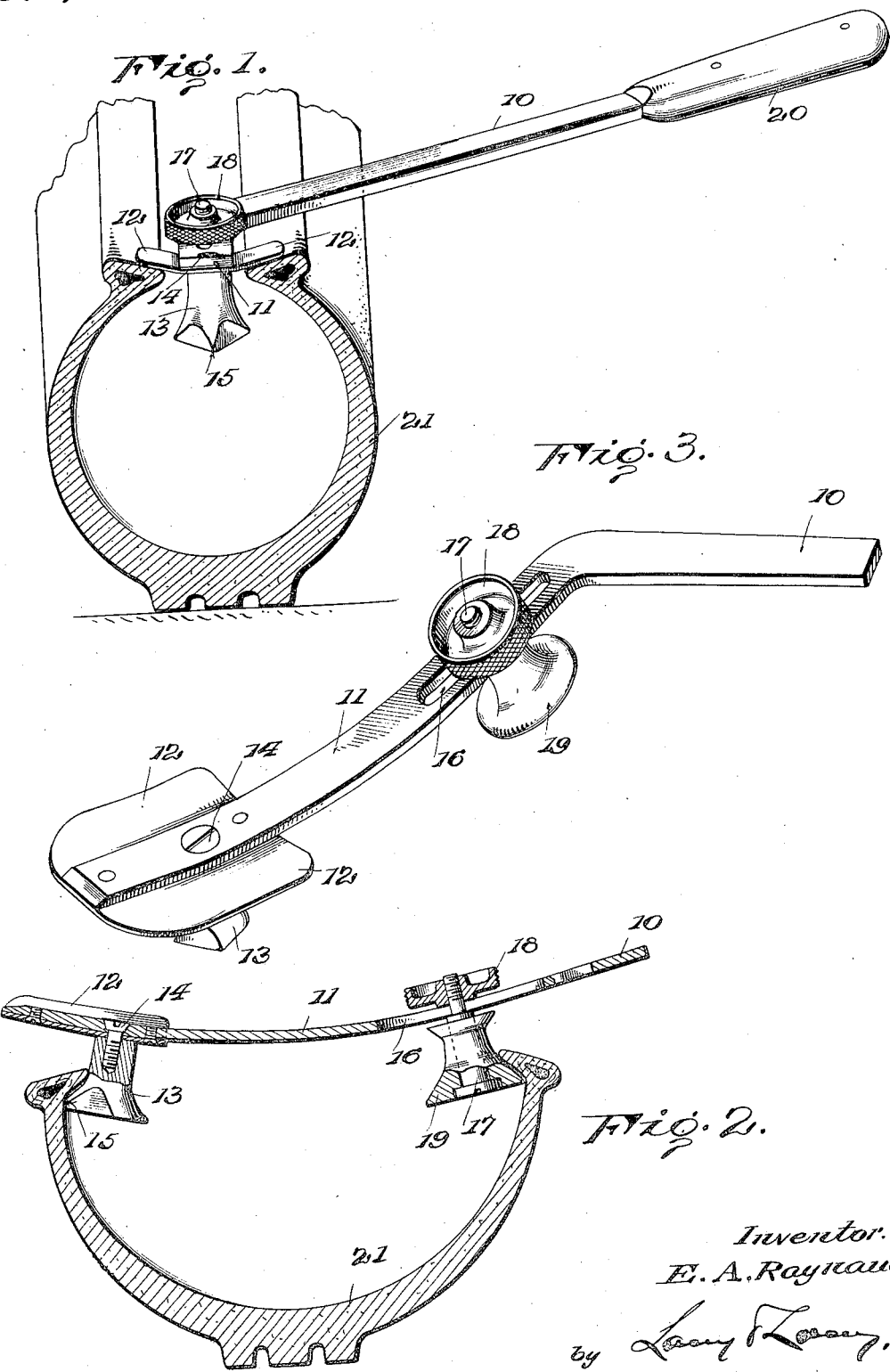

ERNEST A. RAYNAUD, OF SAN DIEGO, CALIFORNIA, ASSIGNOR OF ONE-HALF TO JOHN W. PERKINS, OF SAN DIEGO, CALIFORNIA.

TIRE-SPREADER.

1,375,065.

Specification of Letters Patent.   Patented Apr. 19, 1921.

Application filed February 25, 1920. Serial No. 361,184.

*To all whom it may concern:*

Be it known that I, ERNEST A. RAYNAUD, citizen of the United States, residing at San Diego, in the county of San Diego and State of California, have invented certain new and useful Improvements in Tire-Spreaders, of which the following is a specification.

This invention relates to an improved tire spreader and has as one of its principal objects to provide a device whereby the sides of a pneumatic tire casing may be readily spread apart so that access may be easily had to the interior of the casing.

The invention has as a further object to provide a device which may be readily positioned along the beads of a tire therebetween and then operated for spreading the sides of the tire as desired.

And the invention has as a still further object to provide a device which will not mutilate or abrade the beads of the tire and wherein the device will be provided with adjustable means whereby the spreading of the sides of the tire may be varied.

Other and incidental objects will appear hereinafter.

In the drawings:

Figure 1 is a perspective view showing the manner in which the device is initially engaged between the beads of a tire prior to operating the device for spreading the sides of the tire, the portion of the tire illustrated being of conventional construction, Fig. 2 is a fragmentary sectional view showing the device operated for spreading the sides of the tire, and Fig. 3 is a fragmentary perspective view showing the outer end portion of the shank of the device with the spaced jaws thereon.

In carrying the invention into effect, I employ a metal shank 10 which is provided with a laterally directed lower end portion or arm 11. This arm is longitudinally curved to conform more or less to the inner circumference of a tire casing and mounted upon the arm at its free end is a guide plate 12 riveted or otherwise secured to the lower face of the arm. The guide plate overhangs the arm considerably at its side edges and is bent to provide laterally directed guide wings inclining outwardly and upwardly from the arm. Mounted upon the outer end portion of the arm beneath the guide plate is a fixed post 13 depending from the arm. This post is seated at its upper end against the plate and receives a screw or other approved fastening 14 engaged through the arm for firmly connecting the post therewith. The post is flared toward its lower end and, at its outer side is, as particularly shown in Fig. 1 cut away to provide a bitting edge 15. Formed in the inner end portion of the arm is a longitudinal slot 16 and adjustable longitudinally of this slot is the movable post 17 employed. This post, like the post 13, depends from the arm and is provided at its upper end with a reduced portion freely received through said slot, the reduced portion of the post receiving a thumb nut 18 threaded thereon and adjustable to coact with the arm for clamping the post in adjusted position longitudinally of the slot. Swiveled upon the post is a roller 19 which, like the post 13, is flared toward its lower end and is also flared adjacent its upper end to provide an intermediate channel for receiving a tire bead. Fixed to the shank 10 at its inner end is a suitable handle 20.

In order that the operation of my improved tool may be accurately understood I have, in the drawings, shown the device in connection with the conventional type of pneumatic tire casing 21. As is well known, the large sized tire casings are very stiff, this being particularly true of truck casings, and when repairing such a casing it has, heretofore, proven extremely difficult and laborious to spread the sides of the casing in order to gain access to the interior thereof. In a great many instances this spreading operation is indispensable and the present invention, therefore, seeks to provide a device whereby the sides of a casing may be easily flexed apart. Initially the arm 11 of the tool is, as suggested in Fig. 1, disposed within the slot between the beads of the casing when the post 13 and roller 19 will, of course, project through said slot while the guide plate 12 will contact with the outer faces of the beads for supporting the free end of the arm. The shank 10 may now be swung for shifting the arm to a position extending, as shown in Fig. 2, transversely with respect to the tire when the post 13 will coact with one of the tire beads while the roller 19 will coact with the other of said beads for spreading the sides of the tire. In this connection, it will be observed that since the wings of the plate slope upwardly away from the arm, the free end of the arm will be permitted to drop down between the tire beads to a position lying practically flush with the outer faces thereof. Consequently, when the tool shank is swung for spreading the sides of the tire, as just indicated, any tendency of the post 13 to ride out of the tire will be counteracted since the biting edge 15 of the post will be brought into contact with the adjacent side of the tire below the bead thereon. As soon as this biting edge of the post is thus brought into engagement with the adjacent side of the tire, the post 13 will be held stationary so that as the movement of the shank is continued, the arm 11 will rock about the axis of the post as a center so that the roller 19 will travel along the other bead of the tire for spreading the sides of the tire. The groove of the roller will, as will be seen, coact with this latter bead of the tire for sustaining the shank above said bead so that the shank may be freely rocked. For varying the spreading of the sides of the tire, it is simply necessary to position the post 17 within the slot 16 for varying the distance between the roller 19 and the post 13 and, as will be appreciated, the device may be moved around the inner circumference of the tire and operated at different points therealong, so that the sides of the tire may be spread as it is desired to work therebetween. I accordingly provide a particularly effective device for the purpose set forth and a device which may be readily employed in connection with substantially any conventional type of pneumatic tire casing.

Having thus described the invention, what is claimed as new is:

1. A tire spreader including a shank, spaced posts projecting from the shank and engageable between the beads of a tire casing, and a laterally projecting guide plate carried by the shank adjacent the outermost of said posts.

2. A tire spreader including a shank, spaced posts projecting from the shank and engageable between the beads of a tire casing, and a guide plate carried by the shank adjacent the outermost of said posts, the guide plate being provided with laterally directed wings overhanging the shank and sloping upwardly away therefrom.

3. A tire spreader including a shank directed laterally at its lower end portion to provide an arm, a post fixed to the outer end portion of said arm and held against rotation thereon, the post being flared toward its lower end and provided with a biting edge, a second post depending from the inner end portion of the arm, and a roller journaled upon the latter post and provided with a tire bead receiving groove.

4. A tire spreader including a shank, a roller carried thereby, and a post fixed against rotation upon the shank in spaced relation to said roller whereby the post and roller may be inserted between the beads of a tire casing and the post engaged with one of said beads to act as a pivot supporting the shank for swinging movement to ride the roller against the other of said beads to a position where the post and roller lie in a plane transversely of the casing for spreading the sides of the casing.

5. A tire spreader including a shank having an angularly disposed portion providing an arm, a roller carried by said arm near the inner end thereof, and a post fixed against rotation upon the arm near its outer end whereby the post and roller may be inserted between the beads of a tire casing and the post engaged with one of said beads to act as a pivot supporting the shank for swinging movement to ride the roller against the other of said beads to a position where the post and roller lie in a plane transversely of the casing for spreading the sides of the casing.

In testimony whereof I affix my signature.

ERNEST A. RAYNAUD. [L. S.]